(12) United States Patent
Kmita et al.

(10) Patent No.: US 7,387,482 B2
(45) Date of Patent: Jun. 17, 2008

(54) CARGO SUPPORTING SYSTEM AND METHOD FOR PICKUP TRUCK BED

(75) Inventors: Gerard J Kmita, Allen Park, MI (US); Jeffrey M Aftanas, Ortonville, MI (US)

(73) Assignee: Jac Products, Pontiac, MI (US)

( * ) Notice: Subject to any disclaimer, the term of this patent is extended or adjusted under 35 U.S.C. 154(b) by 264 days.

(21) Appl. No.: 11/260,734

(22) Filed: Oct. 27, 2005

(65) Prior Publication Data

US 2006/0093454 A1     May 4, 2006

Related U.S. Application Data

(60) Provisional application No. 60/624,065, filed on Nov. 1, 2004.

(51) Int. Cl.
*B60P 7/08*   (2006.01)
(52) U.S. Cl. .............. 410/150; 410/121; 410/143; 410/145
(58) Field of Classification Search .......... 410/121, 410/129, 130, 140–145, 150, 151; 224/403; 211/105.3; 248/354.1, 354.5, 354.6
See application file for complete search history.

(56) References Cited

U.S. PATENT DOCUMENTS

| | | | |
|---|---|---|---|
| 3,062,157 A * | 11/1962 | Woods ...................... 410/149 |
| 4,278,376 A | 7/1981 | Hunter ...................... 410/130 |
| 4,964,771 A | 10/1990 | Callihan .................... 410/118 |
| 5,443,190 A | 8/1995 | Cucheran et al. | |
| 5,443,586 A | 8/1995 | Cargill ...................... 410/143 |
| 5,848,744 A | 12/1998 | Dischner et al. | |
| 5,853,116 A | 12/1998 | Schreiner | |
| 5,855,309 A | 1/1999 | Hallsworth | |
| 5,855,310 A | 1/1999 | Van Ert et al. | |
| 5,971,685 A * | 10/1999 | Owens ....................... 410/151 |
| 6,467,663 B1 | 10/2002 | Kmita et al. | |

* cited by examiner

*Primary Examiner*—Stephen Gordon
(74) *Attorney, Agent, or Firm*—Harness, Dickey & Pierce, P.L.C.

(57) ABSTRACT

A cargo restraining system for use within a bed of a pickup truck. The system includes a first pair of rails disposed on sidewalls of the bed. A second pair of support rails are secured to the forward wall of the bed and to an interior surface of the rear liftgate of the bed. First and second independent cross bar assemblies have end supports that are coupled to the support walls so that the assemblies extend perpendicularly from one another. The cross bar assemblies can be adjustably positioned along their associated pair of support rails to engage cargo of widely varying sizes and shapes that is being carried within the bed of the vehicle. The end supports can be simultaneously locked and unlocked from one end of each cross bar assembly.

19 Claims, 8 Drawing Sheets

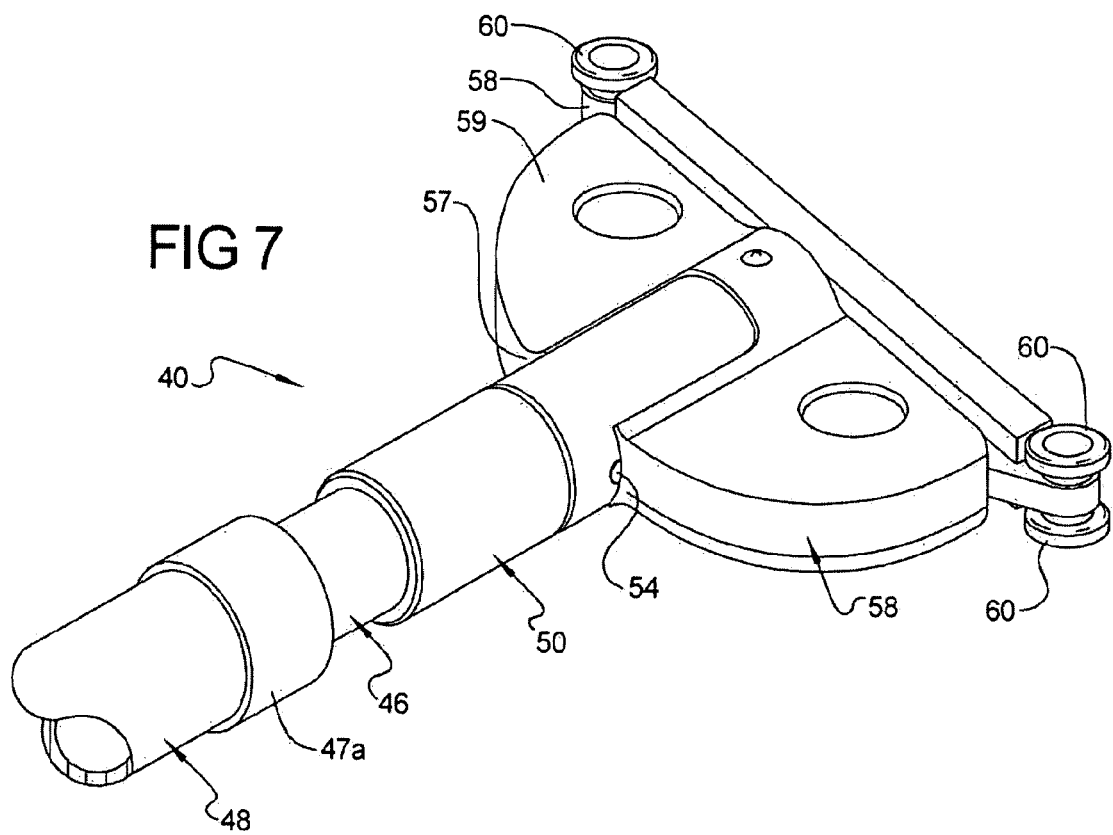

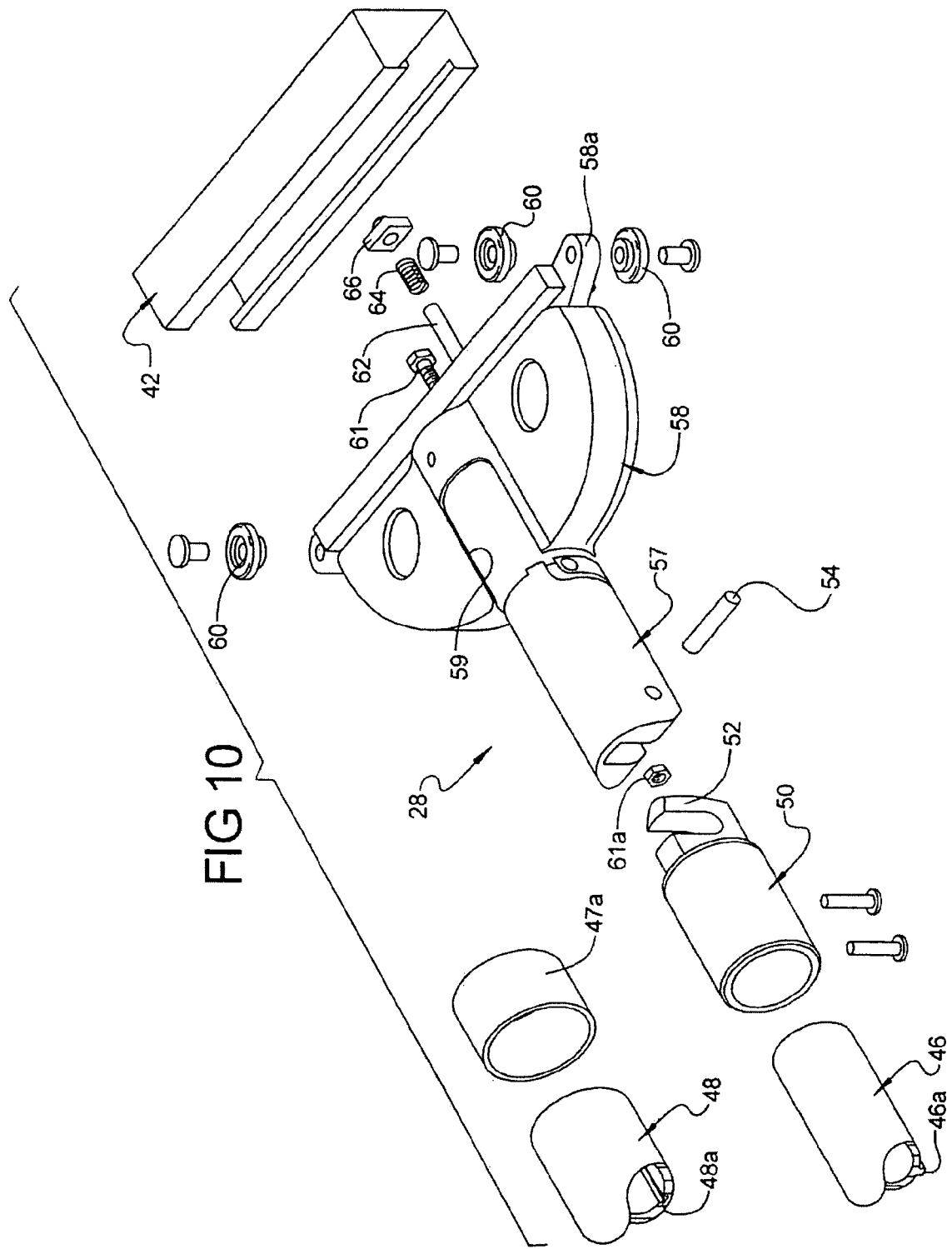

CARGO SUPPORTING SYSTEM AND METHOD FOR PICKUP TRUCK BED

CROSS-REFERENCE TO RELATED APPLICATIONS

This application claims the benefit of U.S. Provisional Application No. 60/624,065, filed on Nov. 1, 2004. The disclosure of the above application is incorporated herein by reference.

FIELD OF THE INVENTION

This invention relates to article carrier systems, and more particularly to an article restraining system adapted particularly for use in a bed of a pickup truck.

BACKGROUND OF THE INVENTION

Article carrier assemblies are used in a wide variety of applications with motor vehicles to carry or restrain articles on a vehicle. Many such vehicle article carriers are adapted to be used on a roof of a motor vehicle for supporting articles above the roof of the vehicle.

One particular style of vehicle that is especially useful for transporting cargo is a pickup truck. Present day pickup trucks have a bed behind a cab portion. The bed is typically of sufficient size to carry a wide variety of cargo items of varying sizes and shapes. However, when carrying cargo or articles of various sizes, often the articles must be restrained in the bed so as to prevent the articles from tipping over, sliding or otherwise moving around in the bed while the vehicle is being driven. There have been previous attempts to provide cargo restraining systems for use with a pickup truck bed, with varying degrees of success. Nevertheless, it would still be highly desirable to provide a cargo restraining system that is specifically adapted for use with a bed of a pickup truck, and that can be easily positioned by a single individual to restrain a wide variety of articles of different sizes and shapes from movement within the bed. It would further be highly desirable to provide such a cargo restraining system that does not otherwise interfere with operation of the liftgate at a rear portion of the bed.

SUMMARY OF THE INVENTION

The present invention is directed to a cargo restraining system especially well adapted for use with a bed of a vehicle, for example, a pickup truck. However, it will be appreciated that the cargo restraining system of the present invention can be used essentially within any box-like area of a vehicle in which it is desired to restrain articles or cargo against movement while the vehicle is being operated.

In one preferred form the cargo restraining system includes a first pair of support rails that are supported from opposing side walls of a bed of a pickup truck. A first cross bar is provided having end supports at each of its opposing ends. The end supports are adapted to be coupled to the first pair of support rails to allow adjustable movement of the first cross bar towards and away from a cab of the vehicle, and locking of the first cross bar assembly at a desired longitudinal position within the bed. At least one of the end supports is constructed so that a cross bar member of the cross bar assembly can be separated from the one end support, and the cross bar member moved away from the one end support to allow quick and easy removal of the article being restrained within the bed. The end supports can be adjustably positioned and locked at different longitudinal positions along the first pair of support rails.

In another embodiment a pair of second support rails are included. One of the second pair of support rails is mounted to a forward wall of the bed while a second one of the second pair of support rails is mounted to a liftgate associated with the bed. A second cross bar assembly having end supports at its opposite ends is coupled to the second pair of support rails and adjustable such that it can be positioned laterally within the bed, and locked at a desired lateral position within the bed. The first cross bar assembly and the second cross bar assembly thus form an intersecting pair of restraining elements that can be adjustably positioned to engage and restrain articles of widely varying shapes and sizes that are being transported within the bed. The two cross bar assemblies also enable the bed to be partitioned into a plurality of distinct compartments, and quickly and easily reconfigured as needed depending upon the type of cargo or articles being transported.

In still another preferred form of the present invention the second cross bar assembly includes a telescoping cross bar component. The telescoping cross bar component allows the liftgate of the vehicle to be lowered and raised without requiring one end or the other of the second cross bar assembly to be uncoupled from its associated support rail.

In still another preferred embodiment each of the cross bar assemblies is constructed to allow both of its end supports to be simultaneously locked and unlocked from one end of the cross bar assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3a is a cross-sectional end view of first and second cross bars assembled together, in accordance with section line 3A-3A in FIG. 1;

FIG. 7 is an assembled view of the upper right most end support shown in FIG. 3 with the cross bar component locked to the end support;

FIG. 10 is an enlarged, exploded perspective view of the end support of FIG. 7.

DETAILED DESCRIPTION OF THE PREFERRED EMBODIMENTS

The following description of the preferred embodiment(s) is merely exemplary in nature and is in no way intended to limit the invention, its application, or uses.

Figure 1:
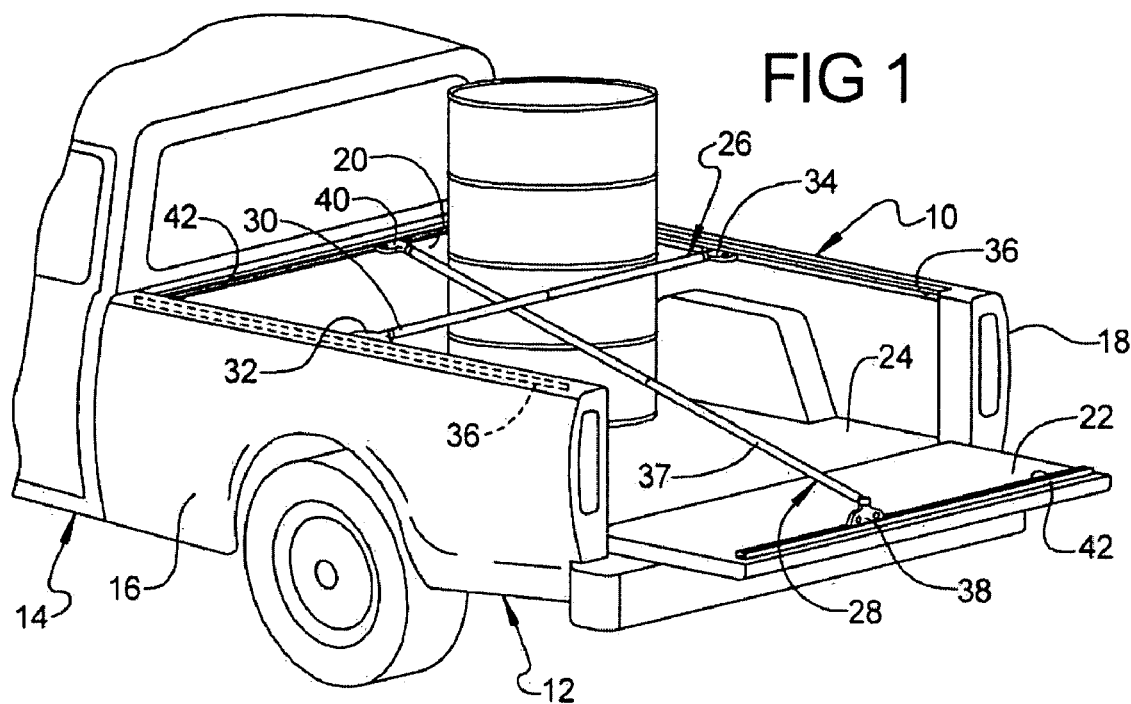
FIG. 1 is a perspective view of a pickup truck having a bed, in which the bed includes a cargo restraining system in accordance with a preferred embodiment of the present invention.

Referring to FIG. 1, there is shown a cargo restraining system 10 in accordance with a preferred embodiment of the present invention. The cargo restraining system 10 is adapted for use within a bed 12 of a vehicle 14 such as a pickup truck. It will be appreciated, however, that the cargo restraining system 10 could be used with any vehicle or structure where it is desirable to restrain cargo or articles, and where a degree of adjustability is needed to restrain articles and/or cargo of widely varying shapes and sizes.

Referring further to FIG. 1, when the system 10 is used with a vehicle 14 such as a pickup truck, the vehicle will include opposing sidewalls 16 and 18, a forward wall 20 and a liftgate 22. The liftgate 22 is shown in its lowered position, but it will be appreciated that the liftgate is hingedly supported from a floor 24 of the bed 12 and can be raised and lowered as needed. The system 10 further includes a first cross bar assembly 26 and a second cross bar assembly 28. The first cross bar assembly 26 includes a cross bar member 30 having end supports 32 and 34. End support 32 is coupled to one of a first pair of support rails 36 mounted near an upper edge of the sidewall 16, on an inside surface of the sidewall 16. End support 34 is similarly coupled to a second one of the first pair of support rails 36 mounted to the opposite sidewall 18 along an inside surface thereof near an upper edge of the sidewall 18. The second cross bar assembly 28 includes a telescoping component 37, and end supports 38 and 40 which are coupled to respective ones of a second pair of support rails 42. One of the support rails 42 is secured to an inside surface of the forward wall 20 of the bed 12 while the other support rail 42 is secured to an inside surface of the liftgate 22 along an upper edge of the liftgate. Each of the end supports 32, 34, 38 and 40 can be adjustably secured to its respective support rail, 36 or 42, so that the system 10 can be adjusted to precisely fit an article or cargo item(s) being transported in the bed 12. In this regard it will be appreciated that the vertical position of one pair of support rails 36 or 42 will be just slightly above or below the other pair.

The system 10 also provides the advantage of partitioning the bed 12 into several distinct compartments as a result of the perpendicularly arranged cross bar assemblies 26 and 28. As will be explained further, the telescoping cross bar component 37 allows the liftgate 22 to be raised or lowered without the need to uncouple either of the end supports 38 or 40 from their respective support rails 42. Thus, both cross bar assemblies 26 and 28 are fully functional, and remain fully functional, regardless of whether the liftgate 22 is in its raised or lowered position.

Figure 2:
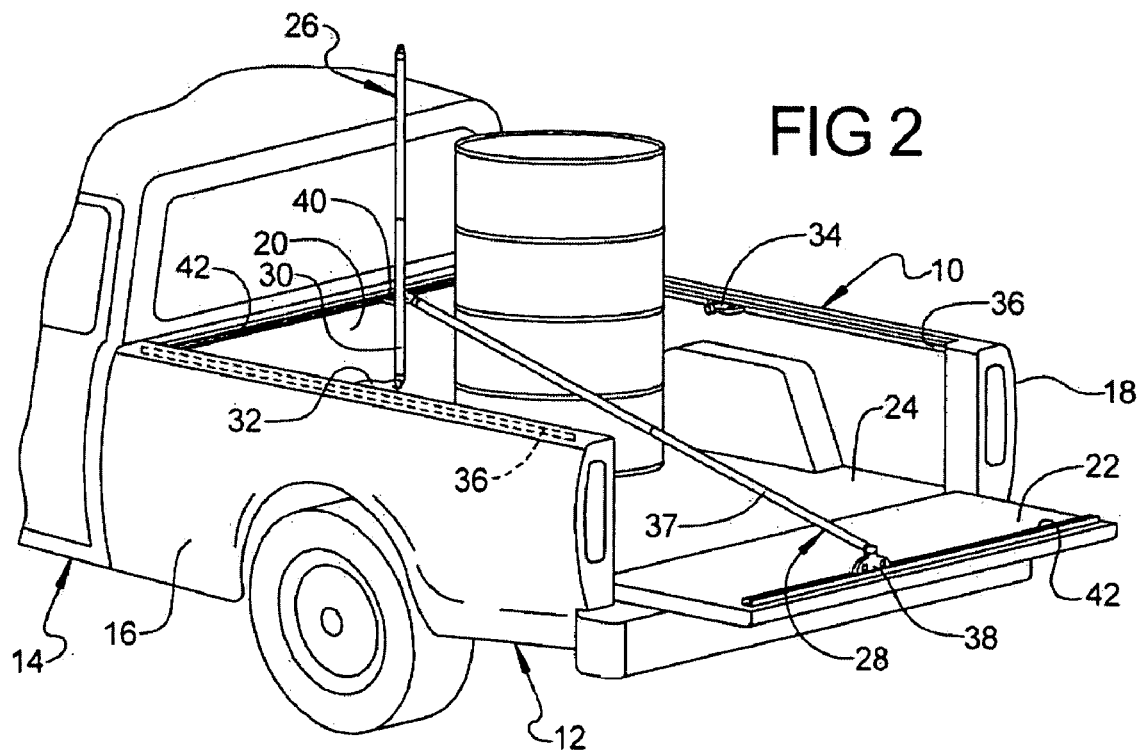
FIG. 2 illustrates the cargo restraining system with one of the cross bar members unsecured from its associated end support, and the other of the cross bar assemblies extended when the liftgate of the vehicle is lowered.

Referring briefly to FIG. 2, as will be explained further, the cross bar member 30 of the first cross bar assembly 26 can be detached from its associated end support 34 at one end thereof. The opposite end of the cross bar member 30 is pivotally supported adjacent end support 32, which allows the cross bar member 30 to be quickly released and pivoted upwardly. This allows larger cargo items such as that illustrated in FIG. 2 to be slid out of the bed 12 without the need to physically uncouple the end support 34 from its associated support rail 36.

Referring to FIGS. 3, 5, 7 and 10, the second cross bar assembly 28 is shown in greater detail. The second cross bar assembly 28 includes a first tube 46 that fits telescopically within a second tube 48. Tubes 46 and 48 form the cross bar component 37. With brief reference to FIG. 3A, first tube 46 includes a spline 46a that rides with a groove 48a in the second tube 48 when the two tubes are assembled. This allows rotation imparted to second rube 48 to cause a corresponding rotation of the first tube 46, the purpose for which will be described momentarily. Collars 47a and 47b are preferably formed from high strength plastic and help to prevent metal-to-metal contact between the two tubes 46 and 48.

Figure 3:
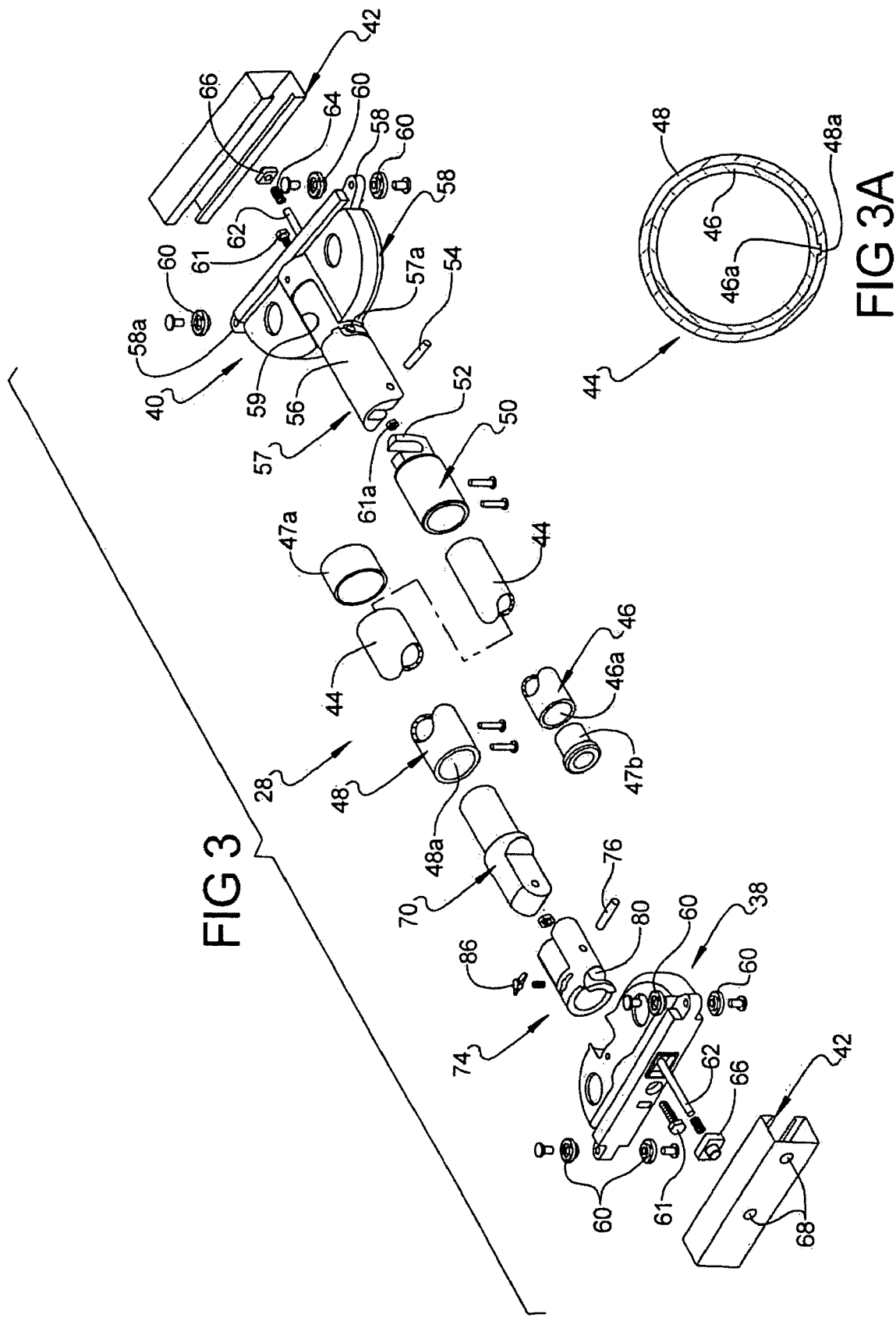
FIG. 3 is an exploded perspective view of one of the cross bar assemblies shown in FIG. 1.

With further reference to FIGS. 3 and 10, a hook member 50 is coupled to one end of the first tube 46. The hook member 50 includes a jaw 52 which engages with a pin 54 of end support 40 when the cross bar assembly 28 is in a locked orientation. The pin 54 is supported within a neck 56 of a camming component 57. A body portion 58 includes flanges 58a having a plurality of wheels 60 supported for movement. A section of body portion 58 fits within support rail 42. The support rail 42 has a generally U-shape when viewed from one end and serves to capture the wheels 60, as well as a section of the body portion 58, within a channel formed by the support rail 42. Thus, the end support 40 is attached to the support rail 42 but can still move slidably along the support rail 42 without binding. The camming component 57 is secured via a threaded bolt 61 and associated nut 61a to the body portion 58. The camming component 57 includes a circumferential camming slot 57a.

Each end support 40 and 38 further includes an L-shaped locking element (e.g., pin) 62, at the end of which is a biasing spring 64 and a pad 66. Locking pin 62 can be partially retracted within the body portion 58, as will be described momentarily. When in its retracted position, each end support 38 and 40 can be moved slidably along their respective support rails 36 or 42. When in the extended position, however, the pad 66 engages within one of a plurality of openings 68 spaced apart along its associated support rail 36 or 42, to thus lock the end support 40 or 38 at a desired position along its associated support rail 36 or 42.

Referring specifically to FIG. 10, the body portion 58 further includes a cutout 59. When the hook member 50 is in the position shown in FIGS. 3 and 10, the hook member cannot be lifted away from the body portion 58. When the hook member 50 is rotated 180° together with the camming component 57, the hook member can be lifted through the cutout 59 and the telescoping components 46 and 48 lifted away from the end support 40.

Figure 4:
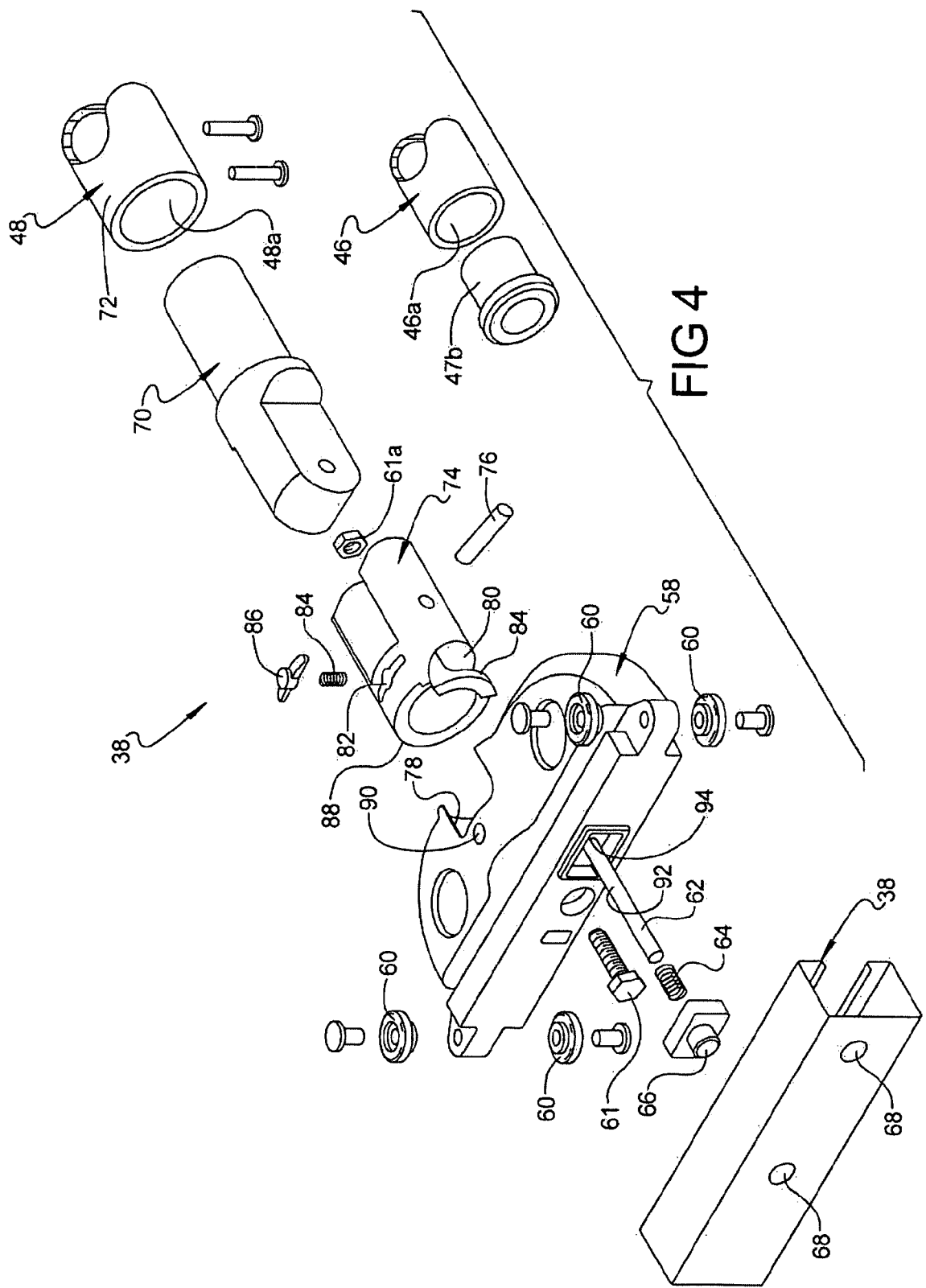
FIG. 4 is an enlarged exploded perspective view of one end of the cross bar assembly shown in FIG. 3.
Figure 5:
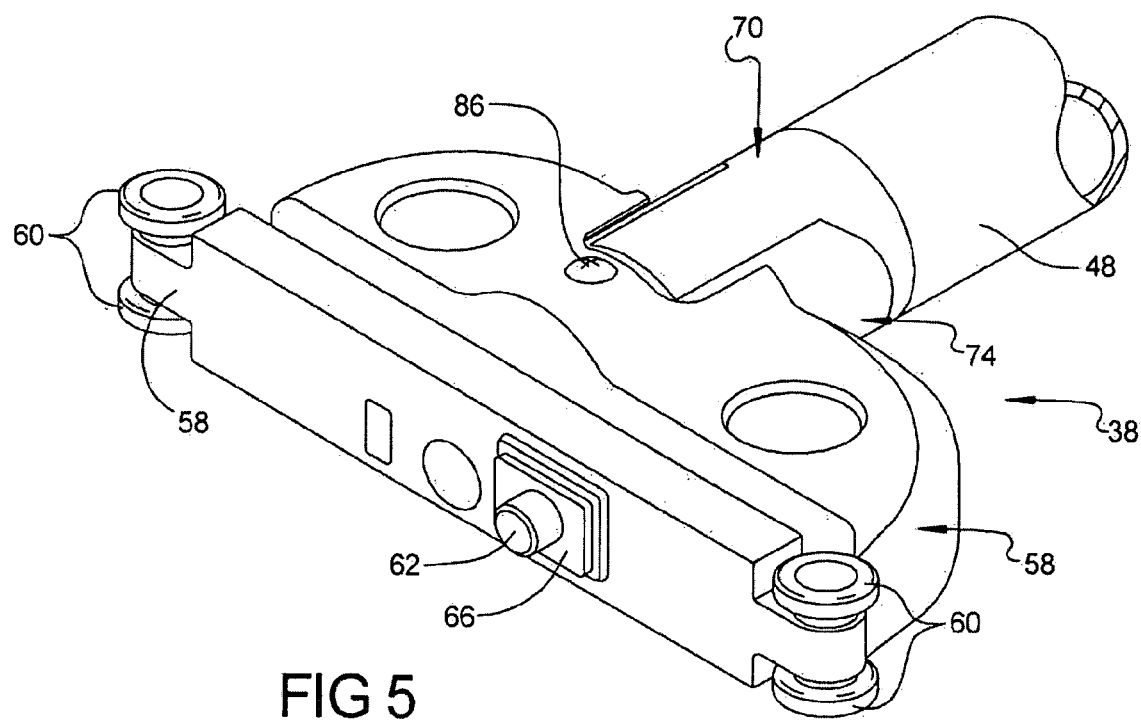
FIG. 5 is a perspective view of the end support shown in FIG. 4 fully assembled.
Figure 6:
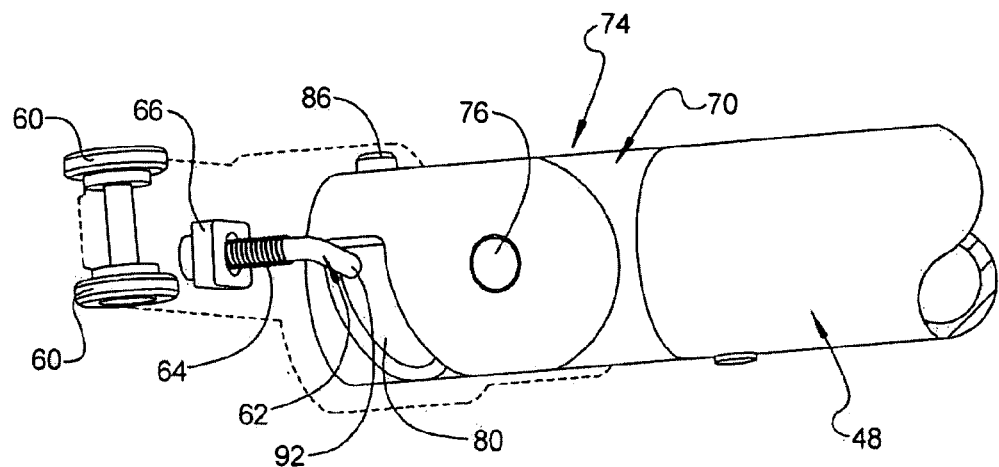
FIG. 6 is a perspective view of the end support of FIG. 4 further illustrating the camming slot used to retract the locking pin into an unlocked position relative to its associated support rail.
Figure 8:
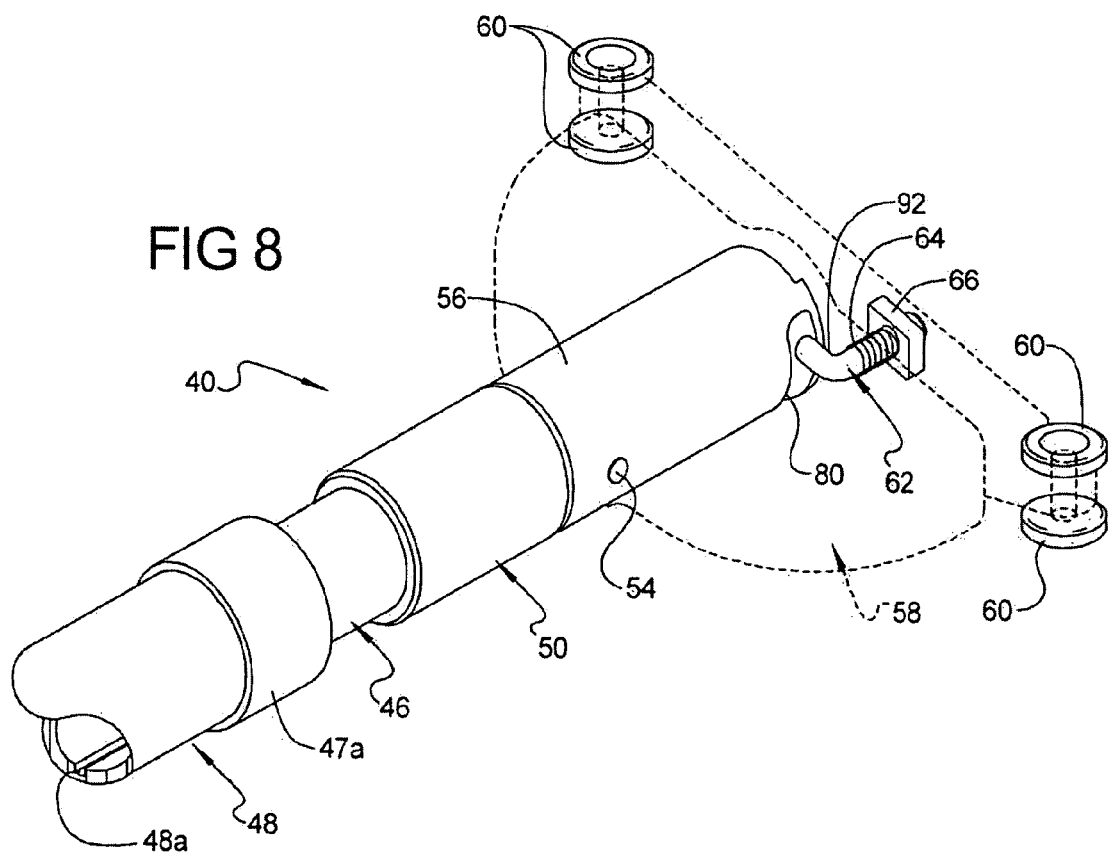
FIG. 8 is a view of the end support of FIG. 7 but illustrating the camming slot used to retract the locking pin of the end support.

With further reference to FIG. 4, end support 38 can be seen in greater detail. End support 38 includes a pivot portion 70 which is secured within an end portion 72 of the second tube 48. The pivot portion 70 is pivotally coupled to a camming member 74 via a pivot pin 76. This allows pivot portion 70 to move pivotally relative to camming member 74. Camming member 74 is similar to camming member 57 and is secured within a cut-out 78 in body portion 58. Camming member 74 includes a circumferential camming slot 80 and a recess 82. Recess 82 receives a biasing member 84 and a release button 86. Camming member 74 is assembled to the body portion 58 by inserting a first end 88 into the recess 78 while depressing release button 86. Release button 86 is received within an opening 90 in the body portion 58 when the member 74 is fully inserted into the recess 78. During this process an end portion 92 of the locking pin 62 is received within the camming slot 80 (FIGS. 6 and 8). This is achieved via an opening 94 in the body portion 58 through which the end 92 extends during the assembly process. Threaded member 61 and nut 61a couple the member 74 to the body portion 58. End support 32 is substantially similar in construction to end support 38, while end support 34 is substantially similar in construction to end support 40. However, end supports 34 and 40 do not make use of the release button 86.

Figure 9:
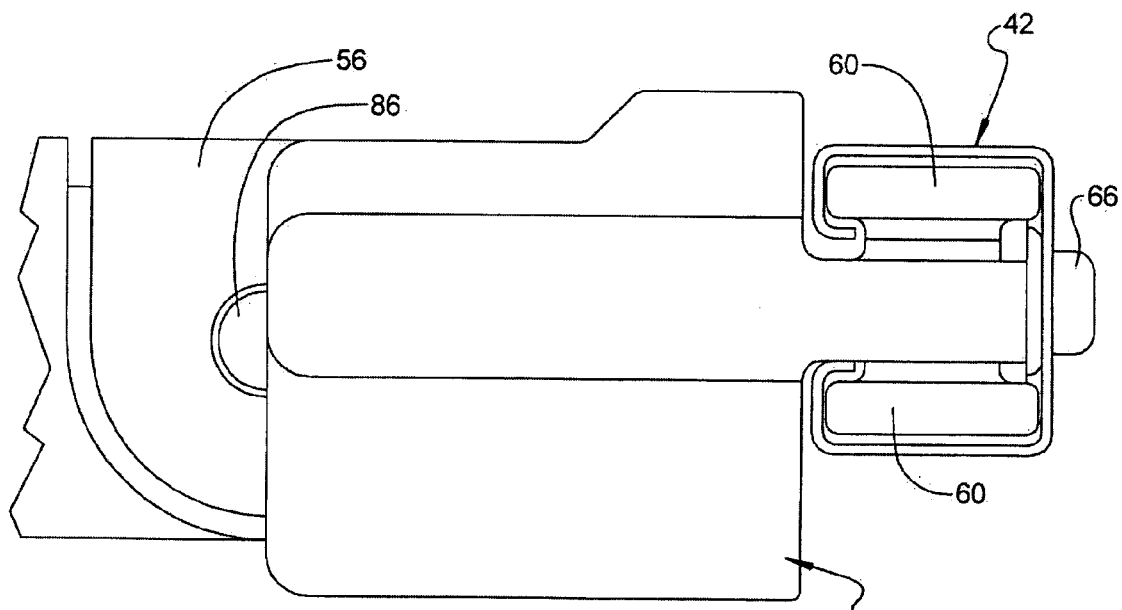
FIG. 9 is an end view of the end support of FIG. 7 illustrating the end support engaged with its associated support rail.

Unlocking the end supports 38 and 40 from their respective support rails 42 is accomplished by first depressing button 86 on end support 38 while grasping camming member 74, and then rotating member 74 (FIG. 9). This causes the end portion 92 of locking pin 62 to ride within the camming slot 80, which causes the locking pin 62 to be retracted outwardly from one of the openings 68. Simultaneously, this rotational movement is transmitted through the tubes 46, 48 to the camming member 57 (FIGS. 3, 7 and 10). This causes a corresponding, simultaneous retraction of the locking pin 62 of end support 40 as the head portion 92 rides within camming slot 57a. Thus, both of the locking pins 62 are simultaneously withdrawn from the openings 68 in which they were just engaged. The locking pins 62 are fully withdrawn (i.e., unlocked) when the camming member 74 is rotated 180° from the position shown in FIG. 4.

Rotating the camming member 74 in the opposite direction urges the locking pin 62 towards one of the openings 68, and the button 86 engages within the opening 90 when the pivot member 74 is returned to its original (i.e., locked) position. Spring 64 at each end support 38 and 40 assists in biasing its respective locking pin 62 back into a locked position. The locking and unlocking action of end supports 32 and 34 are identical in operation to that described for end supports 38 and 40, respectively.

A further advantage is that the hook member 50 is automatically rotated into locking engagement with the body portion 58 (FIGS. 3 and 10) when the camming member 74 is rotated into its locked position. It is only when the camming member 74 is rotated to its unlocked orientation that the hook member 50 is presented in a rotational position where it can be lifted away from the camming member 57.

Thus, the end supports 32 and 38 can be quickly and easily unlocked from its associated support rail 36 or 42 by simply turning the camming member 74 of the end support. This enables simultaneous locking and unlocking of the cross bar assemblies 26 and 28 from one end of each assembly. The pivoting coupling between components 70 and 74 shown in FIG. 4 allows a wide range of pivoting movement to be achieved at end supports 38 and 32. Thus, end support 38 allows the liftgate 22 to be raised and lowered, while the telescoping coupling between first and second tubular members 46 and 48 allows the cross bar member 44 to be extended or retracted as needed. End support 32 thus allows the cross bar member 26 to be pivoted through a wide arc, and also to allow the crossbar member 26 to be stood vertically if needed.

The system 10 is adapted for use in a wide variety of applications, although it is particularly well suited for use in the bed of a pickup truck. The system 10 is lightweight and the cross bar assemblies 26 and 28 can be moved into positions to substantially open the entire area of the bed 12 if desired. Thus, the cross bar assemblies 26 and 28 do not need to be removed if the apparatus 10 is not needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cargo restraint system for use in a bed of motor vehicle, comprising:
   a first pair of support rails disposed on a first pair of opposite, facing walls of said bed;
   a second pair of support rails disposed on a second pair of opposite, facing walls of said bed, generally perpendicular to said first pair of support rails;
   a first cross bar assembly supported for adjustable positioning from said first pair of support rails;
   a second cross bar assembly supported for adjustable positioning from said second pair of support rails so as to extend perpendicular to said first cross bar assembly;
   wherein said cross bar assemblies are selectively positionable to cooperatively restrain cargo items of a plurality of differing sizes within said bed; and
   wherein said first cross bar assembly includes first and second end supports and a cross bar member supported between said first and second end supports, said cross bar member being pivotally coupled to said first end support and releasably coupled to said second end support so that said cross bar member can be released from said second end support and pivoted away from said second end support.

2. The cargo restraint system of claim 1, wherein said second cross bar assembly includes first and second end supports securable to said second support rails and a cross bar member secured between said first and second end supports of said second cross bar assembly and wherein said cross bar member of said second cross bar assembly is pivotally coupled to one of said first and second end supports of said second cross bar assembly.

3. The cargo restraint system of claim 1, wherein said first end support includes a locking component that can be manually engaged by a user to facilitate unlocking of said first end support from engagement with one of said first pair of support rails.

4. The cargo restraint system of claim 3, wherein each of said first and second end supports includes a movable locking element for engaging with a portion of one of said first pair of support rails, to thus hold the end supports at a fixed position along said first pair of support rails.

5. The cargo restraint system of claim 4, wherein said first end support and said second end support each include camming members for assisting in unlocking said end supports from said first pair of support rails.

6. The cargo restraint system of claim 5, wherein said camming members and said cross bar member are cooperably rotatable so that said locking elements of said first and second end supports can be simultaneously disengaged from said first pair of support rails by a user engaging said locking component and then rotating said camming member associated with said first end support.

7. The cargo restraint system of claim 1, wherein at least one of said first and second cross bar assemblies includes a telescopically extendable cross bar member for enabling an overall length of said at least one cross bar assembly to be adjusted.

8. The cargo restraint system of claim 1, wherein each of said cross bar assembly includes:

a pair of end supports; and a cross bar member that is pivotally coupled to one of its associated said pair of end supports.

9. A cargo restraint system for use in a bed of motor vehicle, comprising:

a first pair of support rails disposed on a first pair of opposite, facing walls of said bed;

a second pair of support rails disposed on a second pair of opposite, facing walls of said bed, generally perpendicular to said first pair of support rails;

a first cross bar assembly supported for adjustable positioning from said first pair of support rails;

said first cross bar assembly including first and second end supports engagable with said first pair of support rails;

a second cross bar assembly supported for adjustable positioning from said second pair of support rails so as to extend perpendicular to said first cross bar assembly;

said second cross bar assembly including third and fourth end supports engagable with said second pair of support rails;

at least one of said first and second cross bar assemblies including locking elements at its associated said end supports that can be simultaneously locked and unlocked from one of said end supports associated with said one cross bar assembly; and wherein said cross bar assemblies are positionable to cooperatively restrain cargo items of a plurality of differing sizes within said bed.

10. The cargo restraint system of claim 9, wherein said first cross bar assembly includes a cross bar member supported between said first and second end supports, said first cross bar assembly being pivotally coupled to said first end support and releasably coupled to said second end support so that said cross bar member can be released from said second end support and pivoted away from said second end support.

11. The cargo restraint system of claim 9, wherein said second cross bar assembly includes a cross bar member secured between said third and fourth end supports, and wherein said cross bar member is pivotally coupled to one of said third and fourth end supports.

12. The cargo restraint system of claim 10, wherein said first end support includes a locking component that can be manually engaged by a user to facilitate unlocking of said first end support from engagement with its associated said support rail.

13. The cargo restraint system of claim 12, wherein each of said first and second end supports includes a movable locking element for engaging with a portion of its respective said support rail, to thus hold the first and second end supports at a fixed position along said first pair of support rails.

14. The cargo restraint system of claim 13, wherein said first end support and said second end support each include a camming member for assisting in unlocking said first and second end supports from said first pair of support rails.

15. The cargo restraint system of claim 14, wherein said camming members and said cross bar member are cooperably rotatable so that said locking elements of said first and second end supports can be simultaneously disengaged from said first pair of support rails by a user engaging said locking component and then rotating said camming member associated with said first end support.

16. The cargo restraint system of claim 9, wherein at least one of said first and second cross bar assemblies includes a telescopically extendable cross bar member for enabling an overall length of said at least one of said cross bar assemblies to be adjusted.

17. A cargo restraint system for use in a bed of motor vehicle, comprising:

a first pair of support rails disposed on a first pair of opposite, facing walls of said bed;

a second pair of support rails disposed on a second pair of opposite, facing walls of said bed, generally perpendicular to said first pair of support rails;

a first cross bar assembly supported for adjustable positioning from said first pair of support rails;

said first cross bar assembly including first and second end supports engagable with said first pair of support rails;

a second cross bar assembly supported for adjustable positioning from said second pair of support rails so as to extend perpendicular to said first cross bar assembly;

said second cross bar assembly including third and fourth end supports engagable with said second pair of support rails;

said first cross bar assembly including locking elements disposed in said first and second end suports that enable said first cross bar assembly to be simultaneously locked and unlocked from said first pair of support rails;

said second cross bar assembly including locking elements in said third and fourth end supports that can be simultaneously locked and unlocked from said second pair of support rails;

said first cross bar assembly including a cross bar member disposed between said first and second end supports, said cross bar member being detachable from said second end support and pivotally coupled to said first end support; and wherein said cross bar assemblies are positionable to cooperatively restrain cargo items of a plurality of differing sizes within said bed.

18. The cargo restraint system of claim 17, wherein said first and second end supports include first and second locking elements, respectively, for engaging with said first pair of support rails.

19. The cargo restraint system of claim 18, wherein said first and second end supports include first and second camming members, respectively; and wherein rotational movement of said first camming member while said first locking element is being engaged by a user causes rotational movement of said cross bar member to rotate said second camming member, and thus cause simultaneous unlocking of both of said first and second locking elements.

* * * * *